(12) United States Patent
Paduroiu (10) Patent No.: US 8,799,262 B2
(45) Date of Patent: Aug. 5, 2014

(54) CONFIGURABLE WEB CRAWLER

(75) Inventor: Andrei Paduroiu, Waltham, MA (US)

(73) Assignee: Vistaprint Schweiz GmbH, Winterthur (CH)

( * ) Notice: Subject to any disclaimer, the term of this patent is extended or adjusted under 35 U.S.C. 154(b) by 0 days.

(21) Appl. No.: 13/083,858

(22) Filed: Apr. 11, 2011

(65) Prior Publication Data
US 2012/0259833 A1    Oct. 11, 2012

(51) Int. Cl.
*G06F 7/04*      (2006.01)
*G06F 17/30*    (2006.01)

(52) U.S. Cl.
CPC ................ *G06F 17/30864* (2013.01)
USPC .......................................... 707/710; 707/709

(58) Field of Classification Search
USPC ......... 707/999.003, 999.005, 999.1, 999.101, 707/999.102, 999.107, 709, 710
See application file for complete search history.

(56) References Cited

U.S. PATENT DOCUMENTS

| | | | |
|---|---|---|---|
| 6,418,433 B1 * | 7/2002 | Chakrabarti et al. ................. | 1/1 |
| 7,499,965 B1 * | 3/2009 | Chai ............................ | 709/202 |
| 7,599,920 B1 | 10/2009 | Fox et al. | |
| 7,827,254 B1 * | 11/2010 | Nevill-Manning et al. ... | 709/218 |
| 2006/0212466 A1 * | 9/2006 | Hyder et al. ................... | 707/101 |
| 2007/0180408 A1 * | 8/2007 | Rusu et al. ..................... | 715/855 |
| 2008/0175243 A1 | 7/2008 | Bhagwan et al. | |
| 2009/0119268 A1 * | 5/2009 | Bandaru et al. .................... | 707/3 |
| 2011/0013843 A1 * | 1/2011 | Seeber ......................... | 382/190 |

OTHER PUBLICATIONS

"Notification of Transmittal of the International Search Report and the Written Opinion of the International Searching Authority, or the Declaration," mailed on Jul. 11, 2012 for International Application No. PCT/US2012/033027.
Juffinger, et al., "Distributed Web2.0 Crawling for Ontology Evolution," ICDIM '07, 2nd International Conference on Digital Information Management, IEEE, Oct. 28, 2007, pp. 615-620.
Shkapenyuk, et al., "Design and Implementation of a High-Performance Distributed Web Crawler," Proceedings of the 18th International Conference on Data Engineering, Feb. 26-Mar. 1, 2002; IEEE Comp. Soc, US, vol. Conf. 18, Feb. 26, 2002, pp. 357-368.

\* cited by examiner

*Primary Examiner* — Bruce Moser
(74) *Attorney, Agent, or Firm* — Jessica Costa (57) ABSTRACT

A configurable web crawler allows a user configure a web crawl by specifying one or more of thread throttling rules, domain restriction rules, and crawling rules. The configurable web crawler crawls the web beginning with a seed uniform resource locator and according to the crawl configuration.

34 Claims, 7 Drawing Sheets

CONFIGURABLE WEB CRAWLER

BACKGROUND

An internet (including, but not limited to, the Internet, intranets, extranets and similar networks), is a network of computers, with each computer being identified by a unique address. The addresses are logically subdivided into domains or domain names (e.g. vistaprint.com, vistaprint.co.uk, uspto.gov, etc.) which allow a user to reference the various addresses. A web, (including, but not limited to, the World Wide Web (WWW)) is a group of these computers accessible to each other via common communication protocols, or languages, including but not limited to Hypertext Transfer Protocol (HTTP). Resources on the computers in each domain are identified with unique addresses called Uniform Resource Locator (URL) addresses (e.g. http://www.uspto.gov/forms/index.jsp). A web site is any destination on a web. It can be an entire individual domain, multiple domains, or even a single URL.

Resources can be of many types. Resources with a ".htm" or."html" URL suffix are text files, or pages, formatted in a specific manner called Hypertext Markup Language (HTML). HTML is a collection of tags used to mark blocks of text and assign meaning to them. A specialized computer application called a browser can decode the HTML files and display the information contained within, Often, an HTML file will contain references to image or document files stored on a computer connected to the internet and which is to be loaded and displayed within the page presented to the user within the browser. For example, a company logo may be stored as an image file on a company server. Web pages of the company web site may include HTML image tags that specify the location of an image to be displayed (<img source="pix.logo.jpg"). Preferably, the image tags also include attribute information containing dimensional information about the image to allow the browser to accurately allocate space for the image when rendering the page on the user's display. Typically, the text on the page is rendered first, and then referenced sources such as images and documents are then downloaded and rendered on the display by the browser. If the dimensional attributes are not specified, the browser may have to shift text around after the image loads in order to accommodate the image—an undesirable effect from the user's point of view. An image tag may also include "alt" attributes which can be used to define a name or other identifying information for the image. When a user hovers over the image or image placeholder in the browser, a popup appears containing the name or identifying information.

A hyperlink is a navigable reference in any resource to another resource on the Internet.

An internet Search Engine is a web application that includes a crawler program which visits resources (by following every link on a site or beginning URL) on the internet and extracts data about the visited resources into Resource Repository. Some search engines store the entire resource along with information about the resource in the Resource Repository. Others store only part of the content of a visited page. An indexer program processes the Resource Repository and generates an index to allow faster and easier retrieval of search query results. A Search Engine also includes a Query Engine which receives queries (typically text or boolean queries), examines the index, and returns a set of search results which the Search Engine determines as the best match for the query.

A search engine crawler is a program that travels over the internet and accesses remote resources. The crawler inspects the text of resources on web sites. Navigable references to other web resources contained in a resource are called hyperlinks. The crawler can follow these hyperlinks to other resources. The process of following hyperlinks to other resources, which are then indexed, and following the hyperlinks contained within the new resource, is called crawling.

The main purpose of an internet search engine is to provide users the ability to query the database of internet content to find content that is relevant to them. A user can visit the search engine web site with a browser and enter a query into a form (or page), including but not limited to an HTML form or an ASPX form, provided for the task. The query may be in several different forms, but most common are words, phrases, or questions. The query data is sent to the search engine through a standard interface, including but not limited to the Common Gateway Interface (CGI). The CGI is a means of passing data between a client, a computer requesting data or processing and a program or script on a server, a computer providing data or processing. The combination of form and script is hereinafter referred to as a script application. The search engine will inspect its index for the URLs of resources most likely to relate to the submitted query. The list of URL results is returned to the user, with the format of the returned list varying from engine to engine. Usually the search results will consist of ten or more hyperlinks per search engine page, where each hyperlink is described and ranked for relevance by the search engine by means of various information such as the title, summary, language, and age of the resource. The returned hyperlinks are typically sorted by relevance, with the highest rated resources near the top of the list.

Depending on the query, the returned search results may or may not be considered highly relevant by the user. Often, web sites contain pages, and web pages contain elements, that have content that is not relevant to the purpose of the site or page. For example, many web sites include index pages that contain all of the key words on the site, yet the page itself contains no significant information as purportedly sought by the user via the query terms. The index page is not usually relevant to the purpose of the site, yet contains a keyword in the query terms and thus may appear in the search results as highly relevant to the user's search. The same problem may occur at the page level. On multi-page web sites, every page of the site typically includes one or more navigation menus with links to other pages of the site. The names of the links can be general or quite specific. If the link names are general, for example, "Contact Us", the fact that the navigation menu is crawled on every page is generally not a problem—that is, since so many web pages contain this text, any given page having the term "Contact Us" will generally not rise any higher in the search results for a query that contains the term "Contact" than any other page that also contains the term. If the link names are specific, for example, "Business Cards", then a search query containing the term "business card" may return multiple pages of the web site based on the navigation menu link name which do not actually contain any other connection with the term "business card". In these instances, it would therefore be useful to be able to limit the types of pages and elements searched by the crawler.

U.S. Pat. No. 6,253,198 entitled "Process For Maintaining Ongoing Registration For Pages On A Given Search Engine" describes two methods of controlling the resource files that are added to a search engine database. The first method includes the use of a robots.txt file, which is a site-wide, search engine specific control mechanism. The second method includes the use of the ROBOTS META HTML tag which is resource file specific, but not search engine specific. Most internet search engines respect both methods, and will not index a file if robots.txt, ROBOTS META tag, or both informs the internet search engine to not index a resource. The robots.txt, the ROBOTS META tag and other methods of search engine control is intended to allow a site administrator to control what, if any, of the web site content is crawled by outside Search Engines. For providing search capability of its own web site, the administrator may wish to allow more in-depth searching yet control the scope of the search on a global, page, and element basis. Furthermore, the site administrator may wish to apply different search rules to different specific pages and elements. Neither the Robots.txt file nor the ROBOTS META tag allow this functionality.

It would be desirable to be able to perform a crawl on only particular areas (domains) of a web site and only particular types of pages and/or elements on a page. It would also be desirable to allow a user setting up a crawl to configure rules for the crawl, from the top level URL down to individual page elements. It would further be desirable to allow the user to set up rules on a per-domain, per-page, and per-element basis, and to allow rules inherency.

The World Wide Web consists of thousands of domains and millions of pages of information. The indexing and cataloging of content on an Internet search engine takes large amounts of processing power and time to perform due to the sheer volume of information to retrieve and index, network delays, and page loading latencies. Accordingly, web crawlers are typically multi-threaded in order to crawl multiple areas of web in parallel and to make best use of available CPU and memory. Each thread requests a single page, but since multiple threads are spawned, crawlers are much more aggressive at fetching content than a regular user, and can process that content at a much faster rate.

It may occasionally be desirable to provide search capability for a single web site or area of the web. For example, it may be desirable for a company to provide search capability on the content of its web site to allow visitors to the web site to easily locate pages and/or products of interest. Existing multi-threaded search engines are designed to crawl the World Wide Web and therefore must be aggressive by nature in order to crawl the Web in a reasonably short (at least, for the momentous task it is charged to perform) amount of time. For crawling small areas of the web, for example a company web site, such search engines may be too powerful in that they may have the effect of overwhelming the server hosting the web site through bombardment by multiple crawling threads. This results in the undesired effect of rendering the server slow or even non-responsive to visitors or users of the web site.

It would therefore further be desirable to provide a mechanism for allowing a user to configure the speed and parallelism of a crawl to accommodate various levels of crawl.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

SUMMARY

The present invention is directed to a configurable web crawler for a search engine and related methods and systems.

In an embodiment, a configurable web crawler system includes one or more configuration functions configured to allow a user to configure a crawl configuration for a web crawl, the crawl configuration comprising one or more of thread throttling rules, domain restriction rules, and crawling rules, and a crawling function which receives a starter seed uniform resource locator, and crawls a web, beginning at the starter seed uniform locator, according to the crawl configuration.

In another embodiment, a method for configuring a web crawl includes receiving by one or more processors a starter seed uniform resource locator and a web crawl configuration comprising one or more of thread throttling rules, domain restriction rules, and crawling rules, and crawling a web, beginning at the starter seed uniform locator, according to the web crawl configuration.

In yet another embodiment, a method for configuring a web crawl includes specifying to a configurable web crawler a starter seed uniform resource locator and a web crawl configuration comprising one or more of thread throttling rules, domain restriction rules, and crawling rules. The configurable web crawler is configured to crawl a web beginning at the starter seed uniform locator according to the web crawl configuration.

DETAILED DESCRIPTION

Figure 1:
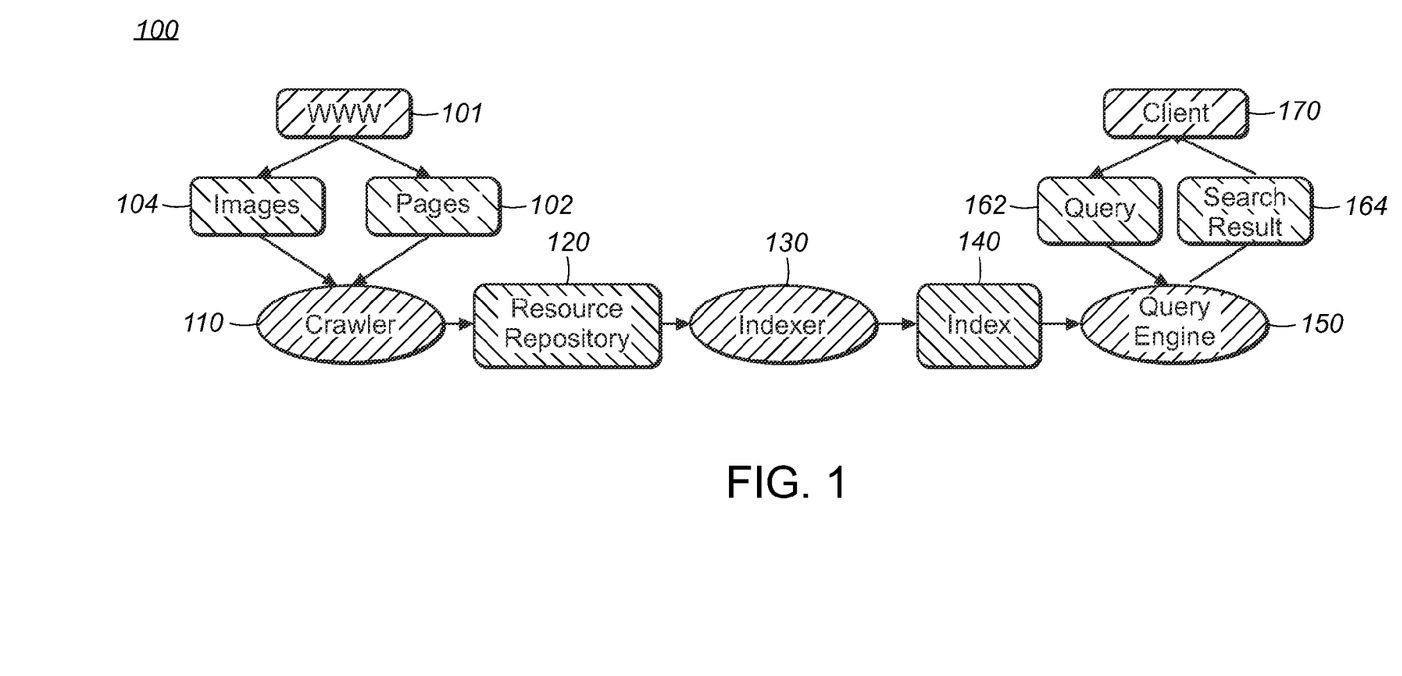
FIG. 1 is a block diagram of an exemplary search engine in which a configurable web crawler operates.

Embodiments of the search engine include a configurable web crawler for a web search engine. FIG. 1 shows a block diagram of an exemplary search engine 100. As shown, the search engine system includes a configurable web Crawler 110, an Indexer 130, and a Query Engine 150.

The Crawler 110 is the main component of the data acquisition system within the search engine system 100. The purpose of the Crawler 100 is to fetch resources such as web pages 102 and/or images 104 from a web-structured system (such as the WorldWideWeb) 101, parse the content of the resource, and extract text, images and outbound links. The Crawler 110 may perform further (minimal) processing with these items and then stores them in a Resource Repository 120.

The Indexer 130 transforms the data stored in the Resource Repository 120 by the Crawler 110 into several data structures (called the Index 130) optimized for search. The Query Engine 150 receives and processes incoming queries 162 (typically from users) from a client 170, accesses the Index 140 to locate the most relevant resources, and returns search results 164 to the client 170.

Figure 2:
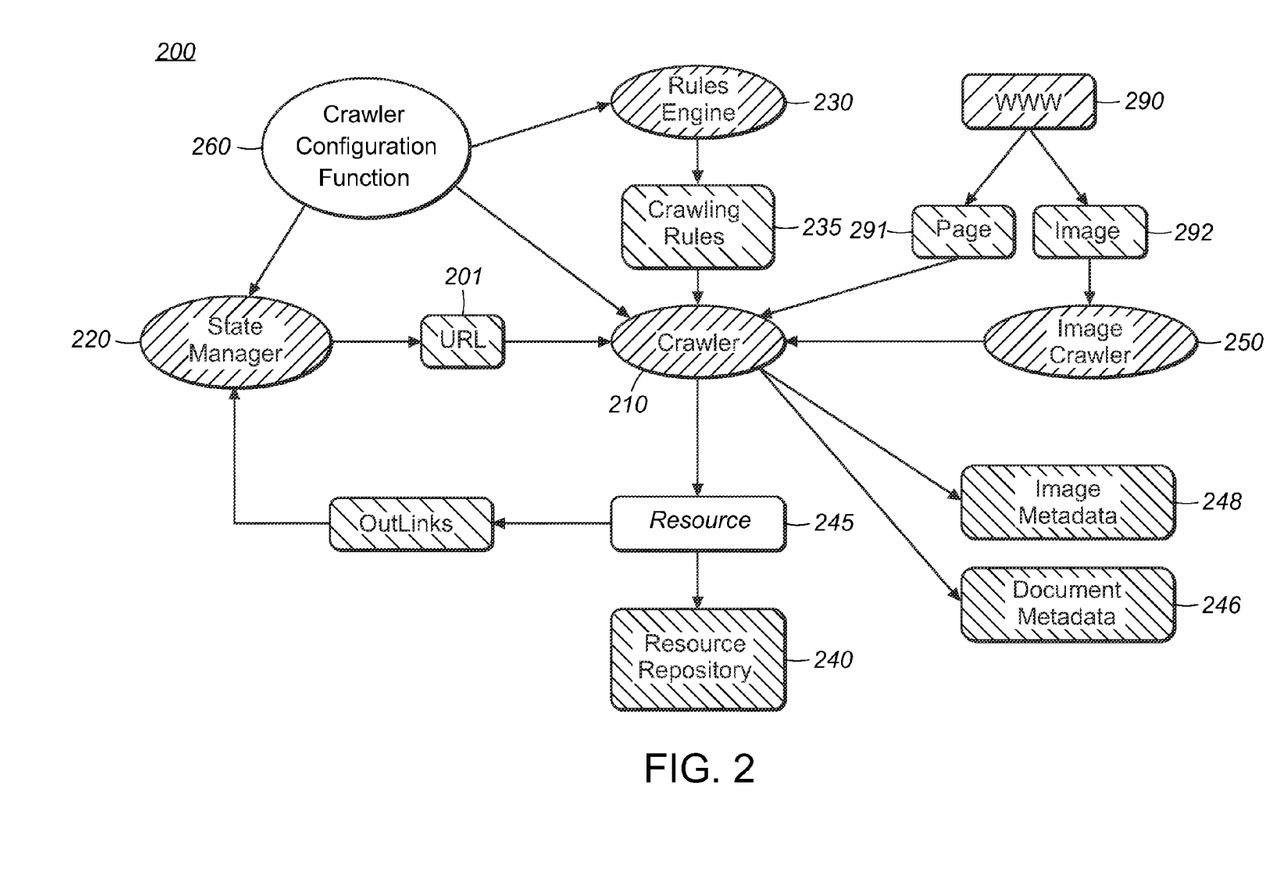
FIG. 2 is a block diagram of an exemplary embodiment of a configurable web crawler implemented in accordance with the principles of the invention.

FIG. 2 is a more detailed block diagram of an exemplary embodiment 200 of the Crawler system 100 of FIG. 1. As shown, the Crawler system 200 includes a Crawler Engine 210 which crawls a portion of a web system, such as the World Wide Web, a web site, or even an internal web-based structure. The Crawler Engine 210 takes as input at least one Uniform Resource Locator (URL) 201 and crawls the web to a specified depth, beginning with the input URL. The Crawler system 200 includes a State Manager 220 which maintains the current state of the current crawl and updates the state as the crawl progresses. The Crawler system 200 also includes a Rules Engine 230 and a set of Crawling Rules 235, which tell the Crawler engine 210 how and what to crawl based on a set of user-defined rules. The Crawling Rules 235 may be configurable by a user, such a web site administrator, to allow different rules to be applied for different components (e.g., global (top URL) level, page level, element level, etc.) crawled by the Crawler.

The Crawler engine 210 crawls the Web starting with the input URL(s) 201 and fetches resources 245. The resources 245 may be text documents (e.g., web page HTML documents, ASPX forms), image documents, or other types of documents renderable by a browser.

The Crawler system 210 stores visited resources 245 in a Resource Repository 240. Document metadata 246 and image metadata 248 associated with resources 245 stored in the Resource Repository 240 are also stored, either in a database along with the resource or in one or more separate repositories. In an embodiment, the Resource Repository 240 is non-transitory computer readable storage media, which may include volatile and nonvolatile, removable and non-removable media implemented in any method or technology for storage of information, such as computer-readable instructions, data structures, program modules, or other data, and may be implemented to include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, memory sticks, or any other medium which can be used to store the desired information and which can be accessed by a computing device.

In an embodiment, the Crawler System 200 also includes an Image Crawler 250. In an embodiment, the Image Crawler 250 is a separate service within the Crawler system 200 itself. The purpose of the Image Crawler 250 is to determine whether an image URL actually points to a valid existing image and, if so, to get the dimensions of the target image. Usually, the Crawler engine 210 determines the image sizes from the HTML image tags associated with the image in the HTML page (provided the image tags actually have the image size attributes set). However, if the Crawler engine 210 is unable to determine the image size from the HTML of the page, it delegates the task of determining the image size to the Image Crawler 250. In an embodiment, requests from the Crawler Engine 250 are queued to the Image Crawler 250 in a First-In-First-Out (FIFO) manner. In an embodiment, the Image Crawler 250 spawns a number of threads that process the image URL request queue as soon as image URL requests need to be processed, fetching the next work item (HTML image metadata), and if the image dimensions are undefined, fetching the image from the web (based on its URL), determining its dimensions, and updating the dimensions of the image resource in the resource repository 240.

Crawler Configuration

In accordance with aspects of the invention, the Crawler system 200 is configured to provide configuration options for various aspects of the crawl, including configuration options for starter seeds, thread throttling, domain restrictions, page blacklists, element filtering, crawling rules, and rule inheritance. In an embodiment, the Crawler system 200 includes a Crawler Configuration Function 260 which provides a user interface allowing a user (e.g., a site administrator) to enter one or more URLs 201 to be crawled, select thread throttling options, enter any domain restrictions and/or page blacklists, set up filters for domains, pages, and page elements, define crawling rules and rule inheritance.

Seeds

One configurable input to the Crawler system 200 is a seed URL 201. Seeds are the URLs on the web where the Crawler engine 210 should begin the crawl. For example, to crawl a company web site, the seed might be the homepage or other top-level page(s) of the web site (e.g, vistaprint.com or vistaprint.com/gallery). For a global company hosting a web site in multiple locales, the seeds might be the homepage of each locale (e.g., vistaprint.com, vistaprint.co.uk, vistaprint.fr, vistaprint.de, vistaprint.jp, etc).

Throttling

As described in the background section herein, search engine crawlers tend to be much more aggressive at fetching content than a regular (human) user, and can process retrieved content at a much faster rate. Multiple pages are requested in parallel by spawning multiple individual threads in order to make the best use of available computing resources and memory. One downside to the use of multi-threaded crawlers is that it is possible to overwhelm the crawled web site's servers, which may result in the appearance of non-responsiveness to other users. Because a web site or domain of the desired crawl may contain a very large number of pages to crawl, however, using too few threads may simply take too long. Choosing the right amount of parallelism is therefore important to the health of both the crawled website and to the effectiveness of the crawler.

The Crawling system 200 therefore preferably includes thread throttling configuration capability. In this regard, thread throttling configuration options may be offered to allow the user to specify the number of threads and delay between resource fetches. In an embodiment, the Crawler Configuration Function provides the user with the following controls to control throttling:

Page Pause Time: Page Pause Time specifies the amount of time to wait between fetching pages within the same thread. The Page Pause Time can be configured with a longer time for busy servers, or can be shortened for infrequently accessed web site(s). In an embodiment, the Page Pause Time may be configured to be the time delay between the end of the processing time for fetching a page and the beginning of the processing time for fetching the next page. In an alternative embodiment, the Page Pause Time is calculated as the maximum of the page processing time required to fetch a page and a maximum Page Pause Time. In this alternative embodiment, if fetching, parsing, and storing the page document took X milliseconds, and the Page Pause Time is set to N seconds, it will fetch the next page a number of Max(N,X) milliseconds after the previous page processing was completed.

Page Crawler Thread Count: the number of worker threads to use when fetching pages (HTML, ASPX, etc.).

Image Crawler Thread Count: the number of worker threads to use when fetching images. Typically, the Image Crawler Thread Count will be much smaller than the Page Crawler Thread Count since (1) it typically takes significantly longer to download and process an HTML page than an image, and (2) there are typically a lot more pages than there are images.

Maximum Threads Per Domain: the maximum number of threads to allocate for one domain at any given time. In order to avoid demanding too much of the total computing resources of a given web servers, the Crawler engine 210 may allow the user to configure the Maximum Threads Per Domain to ensure that the Crawler engine 210 does not ask for too many pages from a particular domain without visiting other domains. In an embodiment, even if the "Page Crawler Thread Count" is specified as a high number, if there are not sufficient distinct domains to crawl, the Crawler may be configured to automatically reduce the actual number of worker threads in order to prevent putting too much strain on the target servers.

Domain Restrictions

The Seed URL(s) 201 instruct the Crawler engine 210 to start crawling at certain pages 292. The Crawler Configuration Function 260 may allow the user to define domain restrictions in order to prevent the Crawler engine 210 from crawling more than it should. For example, if the Crawler system 200 is being used to conduct a site-wide search for a given company, it makes no sense to include content from outside the company web site. However, if one of the crawled pages has a link to outside the site, then the Crawler is at risk of following that link and thus going after the entire WWW 290.

In an embodiment, domain restrictions are expressed as "accepted domains". For a small portion of the World Wide Web 290, such as a company web site, it may be easier to list all domains to be included in a crawl rather than the millions of domains that are to be excluded from the crawl. Accepted domains can be expressed either as absolute values (www.vistaprint.com) or as wildcards (*.vistaprint.com).

Page Blacklists

Similar to Domain Restrictions, it may be desirable to exclude certain pages 291 on the crawled website from ever being visited. This is similar to rules defined in the Robots.txt file, but at a much more granular level. The Robots.txt file is for general, external crawlers (Google, Bing). Page blacklists apply to the current crawl only. Excluded paths can be implanted as either absolute (fully-specified) paths or by way of wildcards (*gallery.aspx, gallery/*).

Element Filtering

A very important feature of the Crawler system 200 is its ability to filter out entire portions of web pages 291. In contrast to Page Blacklists, which exclude entire pages, element filtering enables the user to define crawling rules on a per-DOM-element basis. That is, it can be configured to completely ignore elements with certain ids, only follow links (follow/nofollow) or only record text (index/noindex).

This feature is especially suited to crawling a single or set of related domains, such as a company web site, as the use of element filtering eliminates as much noise as possible from the page. For example, while the Left Navigation menu of a page may provide useful links, the text on it is completely irrelevant for the page that hosts it. Element filtering allows the ability to configure such behavior on a per-element basis.

The Crawler Configuration Function 260 supports adjusting rules 235 on different levels. That is, rules may be set that apply by default to the entire crawling process, and/or others that may apply only to pages within a specific domain, and/or others that apply only to specific pages or only within portions of certain pages. For example, in an embodiment, the complete list of rule domains (from most generic to most specific) is:

Global: Applies to entire crawl, unless overridden at a more specific level

Domain: Applies at the specified domain level, unless overridden at a more specific level Page: Applies at the specified page level, unless overridden at a more specific level Element: Applies at the specified element level Crawling rules 235 may be defined to specify crawling behavior. In an embodiment, crawling rules may be defined, by way of example only and not limitation, to specify the following crawling behavior:

Whether to Record Text
Whether to Follow Links
Whether to Record Meta-Description
Whether to Record Meta-Keywords
Page Title Element Id Override
URL Element Id Override
Excluded Pages (add/remove)
Accepted Domains (add/remove)
Ignored QueryString Parameters (add/remove)

Rule Inheritance

In an embodiment, rules can be nested from generic to specific. That is, if is known in advance that certain rules are desired for an element on a particular page A, but different rules for the same element on page B, then the Crawler Configuration Function 260 may allow the creation of two distinct nested rules, one having page A as the parent, and one having page B as the parent.

In addition, the Crawler Configuration Function 260 may be configured to allow rules to be set up to skip a level. For example, if a specific behavior for an element is desired across all pages, a top-level rule can be created that will apply to all elements on any page, unless overridden.

Below is an example of a set of rules R0, R1, R2, R3, R4, R5 and R6, defined for a particular crawl.

Global level: R0
Element Rule for element "E1": R1
Page rule for page "P1": R2
   Element rule for Element "E2": R3
Page rule for page "P2": R4
   Element rule for Element "E1": R5
   Element rule for Element "E2": R6

As illustrated, Rule R0 is defined to apply at a global level (that is to all pages and all elements). Rule R1 is defined to apply to an element E1 that may appear on any of the pages. Rule R2 is defined to apply to a page P1, and Rule R3 is defined to apply to an element E2 on page P1 (note the nested notation). Rule R4 is defined to apply to a page P2, with rules R5 and R6 defined to apply to respective elements E1 and E2 appearing on page P2 (note again the nested notation).

Rules are inherited in order of general to specific. In this example, when the Crawler system 200 visits:

page P1, the Crawling Engine 210 applies the crawling rules R0+R2 (with inheritance applied in this order)
   element E1 on page P1, the Crawling Engine 210 applies the crawling rules R0+R2+R1 (with inheritance applied in this order)
element E1 on Page P2, the Crawling Engine 210 applies the crawling rules R0+R4+R1+R5 (with inheritance applied in this order)
element E2 on Page P2, the Crawling Engine 210 applies the crawling rules R0+R4+R6 (with inheritance applied in this order)

Figure 3:
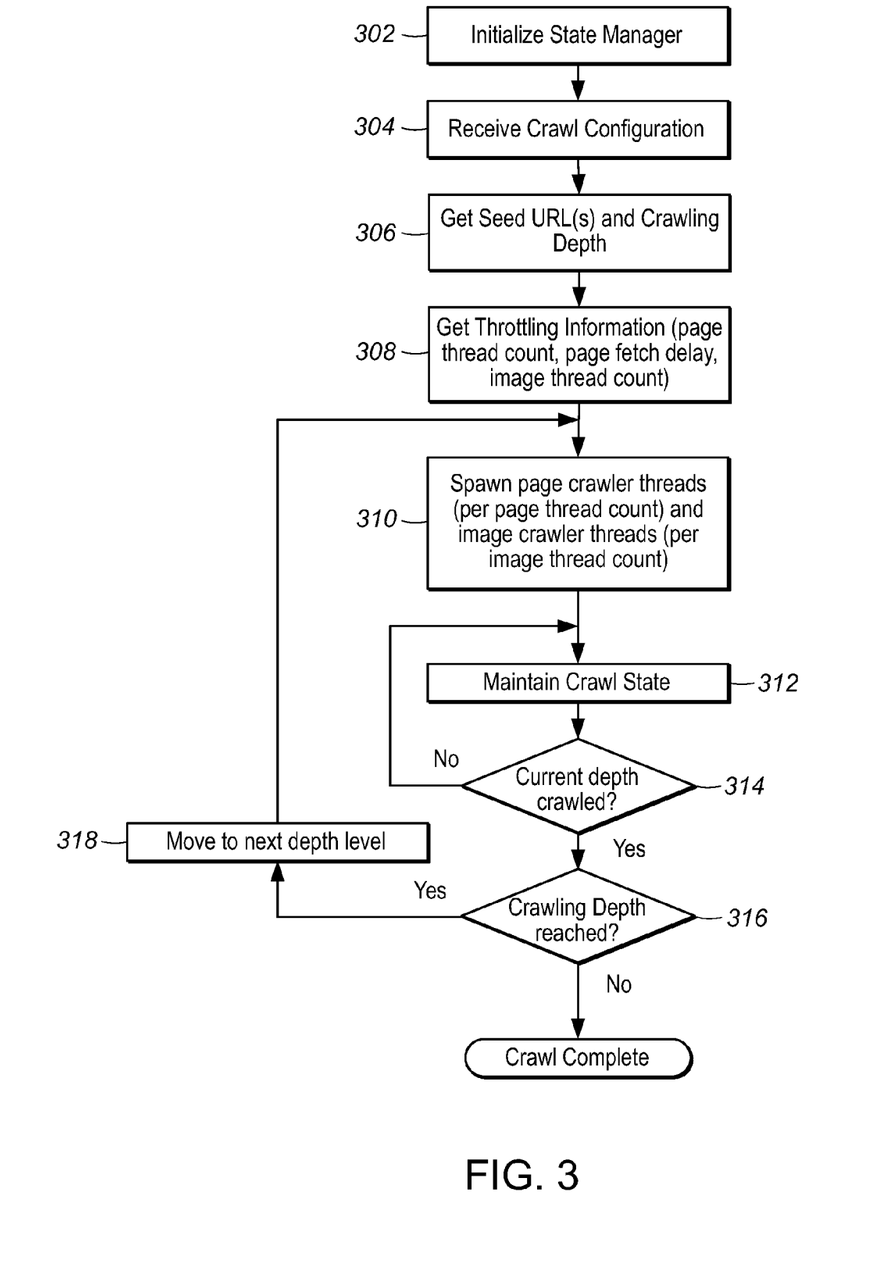
FIG. 3 is an operational flowchart of a process performed by a configurable web crawler in accordance with principles of the invention.

FIG. 3 is a flowchart illustrating an exemplary operation of the Crawler system 200. As illustrated in FIG. 3, the Crawler system 200 begins by initializing the Crawler system State Manager 220 (and any other system services) (step 302). Crawler system 200 receives the configuration for the crawl from the Crawler Configuration Function 220 (step 304). The Crawler system receives the URL seed(s) from which to begin the crawl and the search depth (how many links deep to search) (step 306), and further obtains any thread throttling information for the crawl (step 308). In an embodiment, the Throttling information may include the page pause time, the number of page crawler threads, the number of image crawler threads, and the maximum number of threads allocated per crawled domain.

One or more crawling threads are spawned (step 310), preferably in accordance with the Throttling information. The spawned crawling threads include a number of page crawler threads equal to the number specified in the Throttling information, and a number of image crawler threads equal to the number specified in the Throttling information. The page and image crawler threads fetch and process resources, depositing, where valid, the resources 245 and/or associated information into the resource repository 240. The page crawler threads also process the page resource to extract and send outgoing links to the State Manager 220 for addition to the crawl.

The State Manager 220 monitors the current state, including current crawl depth and processed and unprocessed URLs in the crawl (step 312). Outgoing links received by the page crawling threads are added to a queue of unprocessed URLs for the next depth. When the State Manager 220 determines that all URLs for the current depth have been processed (step 314), the State Manager 220 determines whether the specified crawling depth has been reached (step 316). If not, the State Manager 220 instructs the threads to crawl the next depth, processing URLs from the queue of unprocessed URLs for the next depth (step 318). After the threads have crawled the specified number of levels, (i.e., the specified Crawling Depth for the crawl), the crawl is complete.

Figure 4:
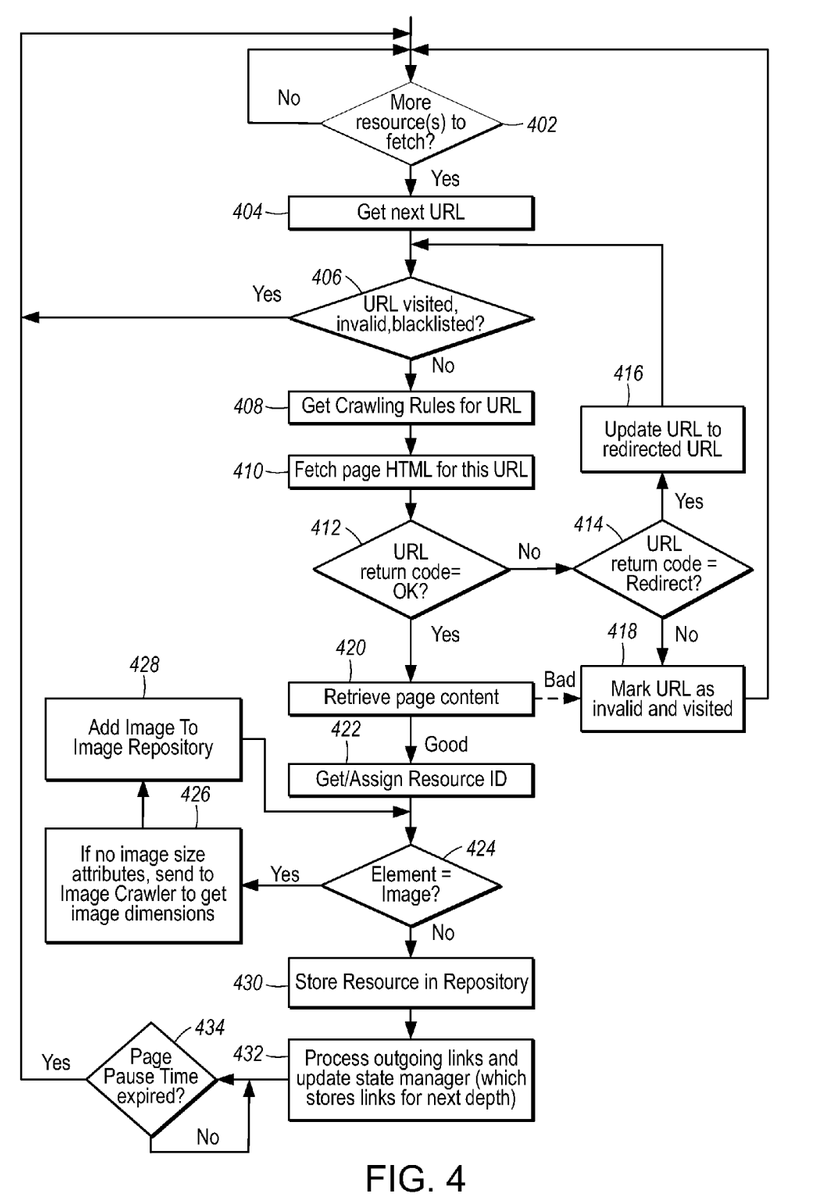
FIG. 4 is an operational flowchart of a process performed by a crawler thread in accordance with principles of the invention.

FIG. 4 is an operational flowchart of an exemplary process executed by a page crawler thread. Generally, all page crawler threads execute the same process in parallel for different resources. The State Manager 220 maintains a queue of unprocessed URL(s). As threads crawl the web, they extract outgoing links, which may be added to the queue 201 of unprocessed URLs, subject to falling within the maximum search depth and page blacklists as determined from the crawl configuration received by the Crawler Configuration Function 260 and the Crawling Rules 235. A thread will continue to execute so long as there are unprocessed URL(s) to fetch from the unprocessed URL queue 201 (step 402). If there is at least one unprocessed URL, a given thread retrieves the next URL to crawl from the queue 201 of unprocessed URL(s) (step 404). The thread then determines if the retrieved URL was previously visited, invalid, or blacklisted (step 406). If so, the thread returns to fetching the next URL from the unprocessed URL queue (step 402). If the fetched URL is neither previously visited, nor invalid, nor blacklisted, the thread retrieves the Crawling Rules 235 for the particular URL (step 408) and the page resource addressed by the URL (step 410).

To fetch the contents (resource) of a URL, a web request is created with the URL as a target. No cookies, JavaScript or cascading style sheets (CSS) are allowed. A response to the web request is then received and analyzed. In an embodiment, the web request is implemented as an HttpWebRequest under the Microsoft .NET Framework with the URL as the target, followed by an HttpResponse request to obtain the response from the server. The HTTP Status code is inspected. If the HTTP status code received from the server hosting the URL is neither an OK (OK/200) code (as determined in step 412) nor a Redirect (Moved/301) code (as determined in step 414) (with the possible additional exceptions of HTTP/304.Not-Modified or HTTP/307.TemporaryRedirect), the URL is marked as invalid and visited (step 418) (so as not to revisit the URL during the crawl), and the thread returns to fetch the next URL from the unprocessed URL queue 201 (step 402). If the HTTP status code received from the server hosting the URL is a Redirect (Moved/301) code, the current URL is updated to the redirect URL address (step 416) and the redirect URL is processed (by returning to step 406) instead. (Other possible exceptions can be HTTP/304.NotModified or HTTP/307.TemporaryRedirect) If the HTTP status code received from the server hosting the URL is an OK code (OK/200), the HTTP Response Headers are collected and the actual page content is then retrieved (step 420). If the Response ContentType is not "text/html", the URL is treated as Invalid, and process passes to step 418 where the URL is marked as invalid and visited.

Once the contents of a valid resource are fetched and validated, the thread retrieves or assigns a resource ID for the resource (step 422). If there are image elements on the page (determined in step 424), the images are retrieved and stored in the resource repository 240 (step 428). If the image META tag does not contain dimensional information for the image, a request for dimensional data is queued to the Image Crawler 250. Image META data (including image attributes such as dimensional information and ALT attributes) are stored in an Image Metadata database 248 associated with the resources in the Resource Repository 240. The resource itself is then stored in the Resource Repository 240 (step 430). Outgoing links in the page HTML are extracted and processed according to the Crawling Rules 235. Any links that are determined to be followed are sent to the State Manager 220 for addition to the unprocessed URL queue 201 for the next depth level (step 432). If a page pause time has been specified via the Crawler Configuration Function 260, the thread then waits (step 434) until the expiration of the specified Page Pause Time before fetching the next URL.

The Crawling system 200 may provide a user interface such as web form (e.g., an ASPX form) allowing a user to input Throttling rules (such as the page pause time, the number of page crawler threads, the number of image crawler threads, and the maximum number of threads allocated per crawled domain) and to set up crawling rules at any of the domain, host, page, and/or element levels. Web forms are very well known in the art. The Crawling system 200 may also be invoked by a command line with parameter inputs. Command line program invocation is also very well known in the art. In an embodiment, the Crawling Rules may be inserted by a user into a configuration file which is then read by the Crawling System at the time of the crawl.

EXAMPLE

Figure 5A:
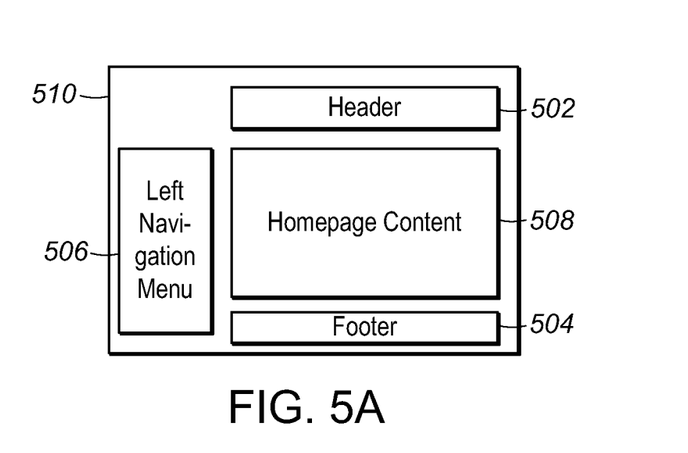
FIGS. 5A-5F are screenshots of example web pages of an example web site.
Figure 5B:
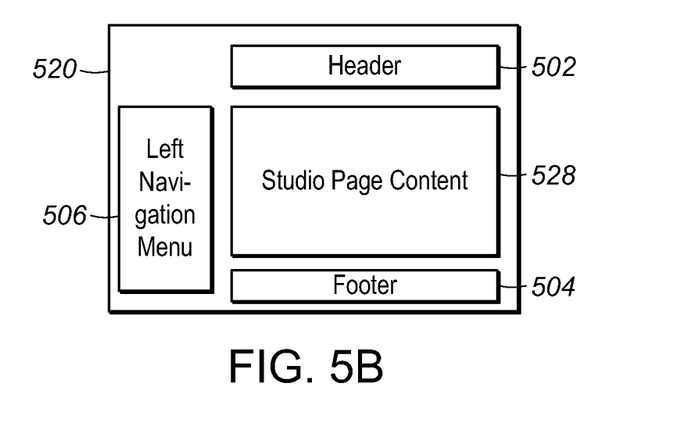
Figure 5C:
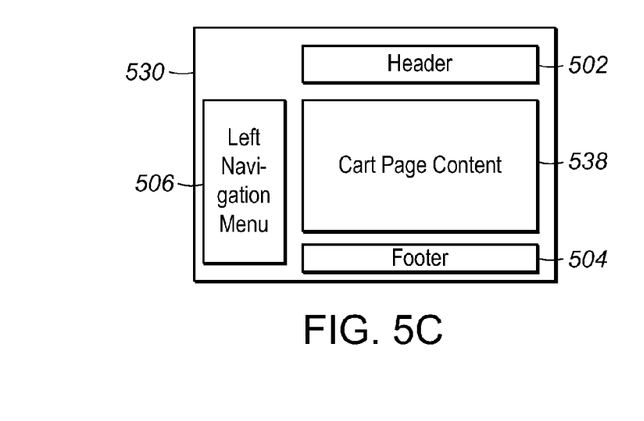
Figure 5D:
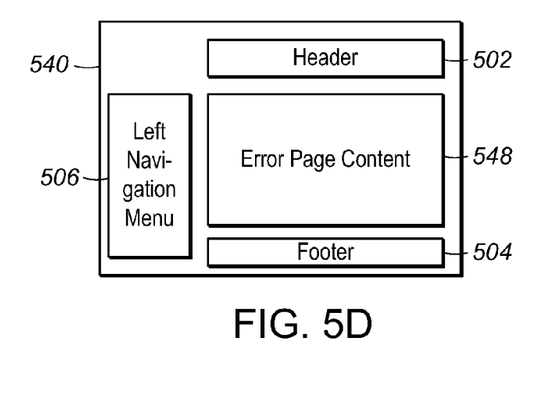
Figure 5E:
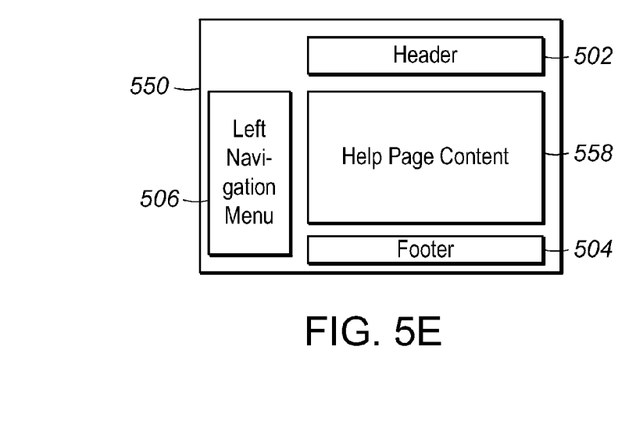
Figure 5F:
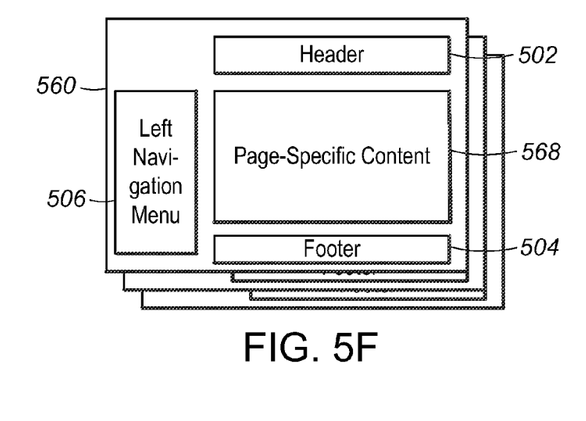

For purposes of illustration of operation of the configurable web crawler, an illustrative example is presented. FIGS. 5A-5F include example web pages 510-560 that together are part of an example web site. In this example, the web site includes exampleURL.com/homepage.aspx 510 (FIG. 5A), exampleURL.com/studio.aspx 520 (FIG. 5B), exampleURL.com/cart.aspx 530 (FIG. 5C), exampleURL.com/error.aspx 540 (FIG. 5D), exampleURL.com/help.aspx 550 (FIG. 5E). The web site exampleURL.com will also include additional web pages 560 (FIG. 5F).

As illustrated in FIGS. 5A-5F, all web pages 510-560 have the same header section 502, where company information is displayed, and the same footer section 504, which links to other important pages on the web site. In addition, each page 510-560 has the same left navigation section 506 which contains links to other pages. Each page 510-560 has its own unique body content 508, 518, 528, 538, 548, 558, and 568.

In an embodiment, the source code of each web page is implemented using HTML. In such embodiment, the header section is identified by the tag <div id="Header">, the footer by the tag <div id="Footer">, and the left navigation section by the tag <div id="LeftNav">. Each element, in addition to the header, footer, and left navigation menu, is also identified by an identifier (id) in a div tag. For example, the page title is identified by a div tag <div id="PageTitle">, etc.

In this example, the goal is to set up the Crawler Rules such that each of the /studio.aspx (FIG. 5B), /cart.aspx (FIG. 5C), and /error.aspx (FIG. 5D) pages 520, 530, 540 are ignored by the Crawler engine, and the text of the page headers 502, page footers 504, and page Left Navigation menus 506 for all pages 510-560 are ignored (but the links followed). In addition, it is desired in this example to add special behavior for the /help.aspx page 550. Accordingly, the following set of rules are defined:

Global Rule (R0):
   Excluded Paths: /studio.aspx, /cart.aspx, /error.aspx
      We never want to get to these pages
   Page title redirect: <div id="PageTitle">
      We do not want to use the real page title, instead we want to fetch it from an element on the page named "PageTitle"
Element Rules:
   Element DOM IDs: "Header", "Footer", "LeftNav" (R1)
      Record text: no
      Record links: yes
      Explanation: we do want to follow links from here, but ignore any text
Page Rules:
   Page Path: /help.aspx (R2)
      Record text: no
      Page title redirect: "helpTopicId"
      Element Rules:
         Element DOM IDs: "helpTopicId", "helpTopicAnswer" (R3)
         Record text: yes The behavior of the Crawling system crawling the "exampleURL.com" and based on the Crawler Rules R0-R3 as defined above, is as follows:

1. Crawler processes homepage of the site (/homepage.aspx)
   1.1. Crawler identifies the appropriate set of rules to use: R0 in this case as no page-level rules match
   1.2. Crawler processes contents of the page, by recording text and identifying links.
      1.2.1. If a links points to either /studio.aspx, /cart.aspx, /error.aspx, the crawler ignores those links and does not add them to the state manager (as defined in rule R0)
   1.3. Crawler reaches element "PageTitle".
      1.3.1. Element is identified as a page title element, and the resulting document's (from the crawl) title is set from the text contents of this element
   1.4. Crawler reaches the element "Header".
      1.4.1. Crawler identifies the appropriate set of rules to use: R0 (inherited)+R1
      1.4.2. Crawler processes contents of the "Header" element, ignoring any text, but recording and following any links in accordance to R0+R1
   1.5. Crawler reaches element "Contents".
      1.5.1. As no element-level rule matches, global rule R0 still applies
   1.6. Other elements of the page contents are processed and their rules apply
2. Crawler processes a page: /help.aspx?topic_id=123
   2.1. Crawler identifies the appropriate set of rules to use: R0+R2 (as R2 matches the page's URL path)
   2.2. Crawler processes the contents of the page, ignoring text but following links
   2.3. Crawler processes contents of the "helpTopicId" element
      2.3.1. Element is identified as a page title element, and the resulting document's (from the crawl) title is set from the text contents of this element
      2.3.2. Crawler identifies the appropriate set of rules to use: R0 (inherited)+R2+R3 (R3 matches the element's DOM id)
      2.3.3. Crawler processes the element, by recording text and links together (note that even though the text on the page as a whole is not recorded, the rules for this element override that of the page)
   2.4. Crawler processes contents of the "helpTopicId" element
      2.4.1. Crawler identifies the appropriate set of rules to use R0 (inherited)+R2+R3 (R3 matches the element's DOM id)
      2.4.2. Crawler processes the element, by recording text and links together (note that even though the text on the page as a whole is not recorded, the rules for this element override that of the page)

In an exemplary embodiment, the Crawler Rules are defined in a dedicated Crawler Rules file using <XML> tags. The Crawler Rules file can be set up by a web site administrator, or can be generated by a user interface program that takes inputs through a form- or wizard-type input interface.

Figure 6:
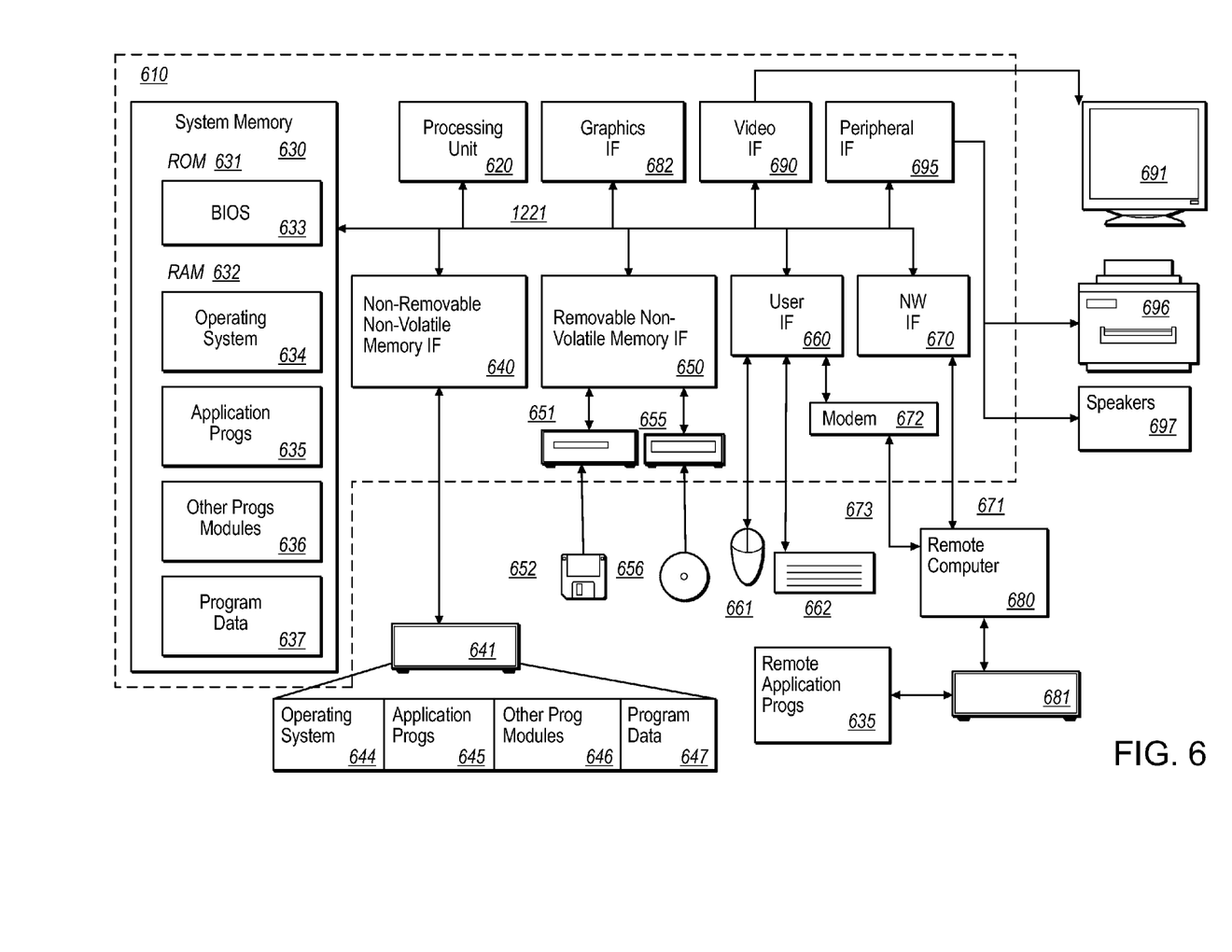
FIG. 6 is an exemplary computing environment in which embodiments of the system may operate.

FIG. 6 illustrates a computer system 610 that may be used to implement any of the servers and computer systems discussed herein, including the Crawler system 110, 200, the Indexer 130, the Query Engine 150, Client(s) 170, and any server on the Internet. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 610. Computer storage media typically embodies computer readable instructions, data structures, program modules or other data.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 640 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6 provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 690.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device, By way of example, and not limitation, FIG. 6 illustrates remote application programs 685 as residing on memory device 681. It will be appreciated that the network connections shown are exemplary and other means of establishing a communications link between the computers may be used.

It will be appreciated that the configurable web crawler described herein allows customizing the crawling behavior at a domain/host/page/ and/or element level. This allows a user to configure the crawl to exclude portions of web pages that are irrelevant to that web page, thus reducing the noise-to-signal ratio in returning relevant search results by the Search Engine.

What is claimed is:

1. A configurable web crawler system, comprising:
    computer-readable media storing a queue of unprocessed URLs of resources;
    one or more processing units configured to receive a user-specified web crawl configuration for crawling a web to inspect text of resources accessible on the web, each resource identified by a unique uniform resource locator (URL), the user-specified web crawl configuration comprising user-specified crawling rules, the crawling rules specifying crawling behavior for at least one each of a general crawl behavior, one or more page-specific crawl behavior to be applied during a crawl to one or more identified pages, and one or more element-specific crawl behavior to be applied during a crawl to one or more identified page elements, wherein the received crawling rules define the crawling behavior in terms of whether to record the resource text, whether to follow hyperlinks of the resource, whether to record text description in metadata associated with the page, whether to record keywords identified in the metadata associated with the page, whether to override a page title element, whether to exclude one or more identified resource pages, whether to exclude one or more identified domains;
    the one or more processing units configured to retrieve from the queue a next unprocessed URL and, if allowed by the specified general crawl behavior and page-specific crawl behavior of the retrieved crawling rules, to fetch the page resource addressed by the retrieved URL and to process the fetched page resource on an element-by-element basis by parsing a next page element from the fetched page resource, and if an element-specific behavior is specified in the retrieved crawling rules for the parsed next page element then operating with regard to the element according to the specified element-specific behavior, and otherwise if a page-specific behavior is specified for the fetched page resource then operating with regard to the element according to the specified page-specific behavior, and otherwise if a global crawl behavior is specified then operating with regard to the element according to the specified global crawl behavior, and otherwise operating with regard to the element according to a default crawl behavior; and repeating the processing until either all elements have been parsed and processed in accordance with the retrieved crawling rules, and wherein the default crawl behavior comprises extracting URLs of outbound links and adding the extracted URLs to the queue, storing text to a resource repository for further analysis, the one or more processing units repeating the processing on available unprocessed URLs in the queue.

2. The configurable web crawler of claim 1, wherein the one or more processing units are further configured to receive a specified crawl depth representing the maximum number of URL links deep from the starter seed URL to crawl, and wherein the default crawl behavior comprises extracting URLs of outbound links and adding the extracted URLs to the queue so long as the specified crawl depth has not been reached.

3. The configurable web crawler of claim 1, wherein the crawling rules define page-specific rules for at least two distinct pages.

4. The configurable web crawler of claim 1, wherein the crawling rules define element-specific rules for at least two distinct elements.

5. The configurable web crawler of claim 1, wherein the distinct elements are specified within the same page resource.

6. The configurable web crawler of claim 1,
wherein the user-specified web crawl configuration further comprises user-specified throttling rules, the throttling rules comprising at least a plurality of a user-specified page pause time, a user-specified number of page crawler threads, and a user-specified maximum number of threads allocated per crawled domain; and
wherein the default crawl behavior further comprises pausing at least the user-specified page pause time before fetching the next page resource, spawning up to the user-specified number of page crawler threads to perform the crawl, and for any given crawled domain, spawning up to the user-specified maximum number of threads allocated per crawled domain.

7. The configurable web crawler of claim 1, wherein the crawling rules further specify crawling behavior for one or more domain-specific crawl behavior to be applied during a crawl to one or more identified domains;
the one or more processing units configured to, only if allowed by the specified general crawl behavior, the domain-specific crawl behavior, and page-specific crawl behavior of the retrieved crawling rules, fetch the page resource addressed by the retrieved URL and to process the fetched page resource on an element-by-element basis by parsing a next page element from the fetched page resource, and if an element-specific behavior is specified in the retrieved crawling rules for the parsed next page element then operating with regard to the element according to the specified element-specific behavior, and otherwise if a page-specific behavior is specified for the fetched page resource then operating with regard to the element according to the specified page-specific behavior, and otherwise if a domain-specific behavior is specified for the fetched page resource then operating with regard to the element according to the specified domain-specific behavior, and otherwise if a global crawl behavior is specified then operating with regard to the element according to the specified global crawl behavior, and otherwise operating with regard to the element according to a default crawl behavior; and
repeating the processing until either all elements have been parsed and processed in accordance with the retrieved crawling rules.

8. The configurable web crawler of claim 7,
wherein the user-specified web crawl configuration further comprises user-specified throttling rules, the throttling rules comprising at least a plurality of a user-specified page pause time, a user-specified number of page crawler threads, and a user-specified maximum number of threads allocated per crawled domain; and
wherein the default crawl behavior further comprises pausing at least the user-specified page pause time before fetching the next page resource, spawning up to the user-specified number of page crawler threads to perform the crawl, and for any given crawled domain, spawning up to the user-specified maximum number of threads allocated per crawled domain.

9. The configurable web crawler of claim 1, wherein the default crawl behavior further comprises determining whether the retrieved page includes any images, when an image identification is detected, retrieving and storing the image associated with the image identification to a resource repository for further analysis, determining whether the image identification has associated therewith dimensional information for the image, and if the fetched page does not include dimensional information for the image, determining the dimensional image from the image itself, and adding the dimensional information and other image attributes to an image metadata database associated with the page resource in the resource repository.

10. The configurable web crawler of claim 9,
wherein the user-specified web crawl configuration further comprises user-specified throttling rules, the throttling rules comprising at least a plurality of a user-specified page pause time, a user-specified number of page crawler threads, a user- specified number of image crawler threads, and a user-specified maximum number of threads allocated per crawled domain; and
wherein the default crawl behavior further comprises pausing at least the user-specified page pause time before fetching the next page resource, spawning up to the user-specified number of page crawler threads to perform the crawl, spawning up to the user-specified number of image crawler threads to determine image dimensional information for page images, and for any given crawled domain, spawning up to the user-specified maximum number of threads allocated per crawled domain.

11. The configurable web crawler of claim 1, wherein the fetched page resource is an HTML page.

12. A method for performing a user-configured web crawl, comprising:
receiving a user-specified web crawl configuration for crawling a web to inspect text of resources accessible on the web, each resource identified by a unique uniform resource locator (URL), the user-specified web crawl configuration comprising user-specified crawling rules specifying crawling behavior,
maintaining a queue of unprocessed URLs of resources;
retrieving from the queue a next unprocessed URL;
retrieving the crawling rules for the retrieved URL, the crawling rules specifying crawling behavior for at least one each of a general crawl behavior, one or more page-specific crawl behavior to be applied during a crawl to one or more identified pages, and one or more element-specific crawl behavior to be applied during a crawl to one or more identified page elements;
if allowed by the specified general crawl behavior and page-specific crawl behavior of the retrieved crawling rules, fetching the page resource addressed by the retrieved URL;
processing the fetched page resource on an element-by-element basis, by parsing a next page element from the fetched page resource, and if an element-specific behavior is specified in the retrieved crawling rules for the parsed next page element then operating with regard to the element according to the specified element-specific behavior, and otherwise if a page-specific behavior is specified for the fetched page resource then operating with regard to the element according to the specified page-specific behavior, and otherwise if a global crawl behavior is specified then operating with regard to the element according to the specified global crawl behavior, and otherwise operating with regard to the element according to a default crawl behavior; and repeating the processing until either all elements have been parsed and processed in accordance with the retrieved crawling rules, and wherein the default crawl behavior comprises extracting URLs of outbound links and adding the extracted URLs to the queue, storing text to a resource repository for further analysis; and repeating the steps of retrieving the next unprocessed URL through this repeating step until the queue is empty of unprocessed URLs; and wherein the retrieved crawling rules define the crawling behavior in terms of whether to record the resource text, whether to follow hyperlinks of the resource, whether to record text description in metadata associated with the page, whether to record keywords identified in the metadata associated with the page, whether to override a page title element, whether to exclude one or more identified resource pages, whether to exclude one or more identified domains.

13. The method of claim 12, wherein the fetched page resource is an HTML page.

14. The method of claim 12, comprising
receiving a specified crawl depth representing the maximum number of URL links deep from the starter seed URL to crawl, and wherein the default crawl behavior comprises extracting URLs of outbound links and adding the extracted URLs to the queue so long as the specified crawl depth has not been reached.

15. The method of claim 12,
wherein the crawling rules define page-specific rules for at least two distinct pages.

16. The method of claim 15, wherein the crawling rules define element-specific rules for at least two distinct elements.

17. The method of claim 15, wherein the distinct elements are specified within the same page resource.

18. The method of claim 12,
wherein the user-specified web crawl configuration further comprises user-specified throttling rules, the throttling rules comprising at least a plurality of a user-specified page pause time, a user-specified number of page crawler threads, and a user-specified maximum number of threads allocated per crawled domain; and
wherein the default crawl behavior further comprises pausing at least the user-specified page pause time before fetching the next page resource, spawning up to the user-specified number of page crawler threads to perform the crawl, and for any given crawled domain, spawning up to the user-specified maximum number of threads allocated per crawled domain.

19. The method of claim 12,
wherein the crawling rules further specify crawling behavior for one or more domain-specific crawl behavior to be applied during a crawl to one or more identified domains;
fetching the page resource addressed by the retrieved URL and assigning a resource identifier for the fetched page resource only if allowed by the specified general crawl behavior, the domain-specific crawl behavior, and page-specific crawl behavior of the retrieved crawling rules;
processing the fetched page resource on an element-by-element basis, by parsing a next page element from the fetched page resource, and if an element-specific behavior is specified in the retrieved crawling rules for the parsed next page element then operating with regard to the element according to the specified element-specific behavior, and otherwise if a page-specific behavior is specified for the fetched page resource then operating with regard to the element according to the specified page-specific behavior, and otherwise if a domain-specific behavior is specified for the fetched page resource then operating with regard to the element according to the specified domain-specific behavior, and otherwise if a global crawl behavior is specified then operating with regard to the element according to the specified global crawl behavior, and otherwise operating with regard to the element according to a default crawl behavior.

20. The method of claim 19,
wherein the user-specified web crawl configuration further comprises user-specified throttling rules, the throttling rules comprising at least a plurality of a user-specified page pause, time, a user-specified number of page crawler threads, and a user-specified maximum number of threads allocated per crawled domain; and
wherein the default crawl behavior further comprises pausing at least the user-specified page pause time before fetching the next page resource, spawning up to the user-specified number of page crawler threads to perform the crawl, and for any given crawled domain, spawning up to the user-specified maximum number of threads allocated per crawled domain.

21. The method of claim 12,
wherein the default crawl behavior further comprises determining whether the retrieved page includes any images, when an image identification is detected, retrieving and storing the image associated with the image identification to a resource repository for further analysis, determining whether the image identification has associated therewith dimensional information for the image, and if the fetched page does not include dimensional information for the image, determining the dimensional image from the image itself, and adding the dimensional information and other image attributes to an image metadata database associated with the page resource in the resource repository.

22. The method of claim 21,
wherein the user-specified web crawl configuration further comprises user-specified throttling rules, the throttling rules comprising at least a plurality of a user-specified page pause, time, a user-specified number of page crawler threads, a user-specified number of image crawler threads, and a user-specified maximum number of threads allocated per crawled domain; and
wherein the default crawl behavior further comprises pausing at least the user-specified page pause time before fetching the next page resource, spawning up to the user-specified number of page crawler threads to perform the crawl, spawning up to the user-specified number of image crawler threads to determine image dimensional information for page images, and for an,/given crawled domain, spawning up to the user-specified maximum number of threads allocated per crawled domain.

23. Non-transitory computer readable storage tangibly embodying program instructions which, when executed by a computer, implement the method of claim 12.

24. A method for configuring a web crawl, the method comprising the steps of:
specifying a starter seed uniform resource locator (URL) and a user-specified web crawl configuration to a configurable web crawler which crawls a web to inspect text of page resources accessible on the web, each page resource identified by a unique URL, the user-specified web crawl configuration comprising user-specified crawling rules specifying crawling behavior, the crawling rules specifying crawling behavior for at least one each of a general crawl behavior, one or more page-specific crawl behavior to be applied during a crawl to one or more identified pages, and one or more element-specific crawl behavior to be applied during a crawl to one or more identified page elements, wherein the received crawling rules define the crawling behavior in terms of whether to record the resource text, whether to follow hyperlinks of the resource, whether to record text description in metadata associated with the page, whether to record keywords identified in the metadata associated with the page, whether to override a page title element, whether to exclude one or more identified resource pages, whether to exclude one or more identified domains;
wherein the configurable web crawler is configured to maintain a queue of unprocessed URLs of resources, insert the specified starter seed URL into the queue of unprocessed URLs of resources, retrieve from the queue a next unprocessed URL, retrieve the user-specified web crawl configuration which specifies the crawling rules, and if allowed by the specified general crawl behavior and page-specific crawl behavior of the retrieved crawling rules, fetch the page resource addressed by the retrieved URL and process the fetched page resource on an element-by-element basis by parsing a next page element from the fetched page resource, and if an element-specific behavior is specified in the retrieved crawling rules for the parsed next page element then operating with regard to the element according to the specified element-specific behavior, and otherwise if a page-specific behavior is specified for the fetched page resource then operating with regard to the element according to the specified page-specific behavior, and otherwise if a global crawl behavior is specified then operating with regard to the element according to the specified global crawl behavior, and otherwise operating with regard to the element according to a default crawl behavior; and repeating the processing until either all elements have been parsed and processed in accordance with the retrieved crawling rules, and wherein the default crawl behavior comprises extracting URLs of outbound links and adding the extracted URLs to the queue, storing text to a resource repository for further analysis, the one or more processing units repeating the processing on available unprocessed URLs in the queue.

25. The method of claim 24, comprising specifying a crawl depth indicating to the web crawler a maximum number of URL links deep from the starter seed URL to crawl, and wherein the default crawl behavior comprises extracting URLs of outbound links and adding the extracted URLs to the queue so long as the specified crawl depth has not been reached.

26. The method of claim 25, wherein the distinct elements are specified within the same page resource.

27. The method of claim 24, wherein the crawling rules define page-specific rules for at least two distinct pages.

28. The method of claim 24, wherein the crawling rules define element-specific rules for at least two distinct elements.

29. The method of claim 24,
wherein the user-specified web crawl configuration further comprises user-specified throttling rules, the throttling rules comprising at least a plurality of a user-specified page pause time, a user-specified number of page crawler threads, and a user-specified maximum number of threads allocated per crawled domain; and
wherein the default crawl behavior further comprises pausing at least the user-specified page pause time before fetching the next page resource, spawning up to the user-specified number of pare crawler threads to perform the crawl, and for any given crawled domain, spawning up to the user-specified maximum number of threads allocated per crawled domain.

30. The method of claim 24, wherein the crawling rules further specify crawling behavior for one or more domain-specific crawl behavior to be applied during a crawl to one or more identified domains;
wherein the web crawler is configured to, only if allowed by the specified general crawl behavior, the domain-specific crawl behavior, and page-specific crawl behavior of the retrieved crawling rules, fetch the page resource addressed by the retrieved URL and to process the fetched page resource on an element-by-element basis by parsing a next page element from the fetched page resource, and if an element-specific behavior is specified in the retrieved crawling rules for the parsed next page element then operating with regard to the element according to the specified element-specific behavior, and otherwise if a page-specific behavior is specified for the fetched page resource then operating with regard to the element according to the specified page-specific behavior, and otherwise if a domain-specific behavior is specified for the fetched page resource then operating with regard to the element according to the specified domain-specific behavior, and otherwise if a global crawl behavior is specified then operating with regard to the element according to the specified global crawl behavior, and otherwise operating with regard to the element according to a default crawl behavior; and repeating the processing until either all elements have been parsed and processed in accordance with the retrieved crawling rules.

31. The method of claim 30,
wherein the user-specified web crawl configuration further comprises user-specified throttling rules, the throttling rules comprising at least a plurality of a user-specified page pause time, a user-specified number of page crawler threads, and a user-specified maximum number of threads allocated per crawled domain; and
wherein the default crawl behavior further comprises pausing at least the user-specified page pause time before fetching the next page resource, spawning up to the user-specified number of page crawler threads to perform the crawl, and for any given crawled domain, spawning up to the user-specified maximum number of threads allocated per crawled domain.

32. The method of claim 24, wherein the default crawl behavior of the web crawler further comprises determining whether the retrieved page includes any images, when an image identification is detected, retrieving and storing the image associated with the image identification to a resource repository for further analysis, determining whether the image identification has associated therewith dimensional information for the image, and if the fetched page does not include dimensional information for the image, determining the dimensional image from the image itself, and adding the dimensional information and other image attributes to an image metadata database associated with the page resource in the resource repository.

33. The method of claim 32,
- wherein the user-specified web crawl configuration further comprises user-specified throttling rules, the throttling rules comprising at least a plurality of a user-specified page pause time, a user-specified number of page crawler threads, a user-specified number of image crawler threads, and a user-specified maximum number of threads allocated per crawled domain; and
- wherein the default crawl behavior further comprises pausing at least the user-specified page pause time before fetching the next page resource, spawning up to the user-specified number of page crawler threads to perform the crawl, spawning up to the user-specified number of image crawler threads to determine image dimensional information for page images, and for any given crawled domain, spawning up to the user-specified maximum number of threads allocated per crawled domain.

34. The method of claim 24, wherein the fetched page resource is an HMTL page.

* * * * *